(12) United States Patent
Czernobil et al.

(10) Patent No.: US 12,078,229 B1
(45) Date of Patent: Sep. 3, 2024

(54) DUAL CLUTCH POWER SHIFT TRANSMISSION

(71) Applicant: CNH Industrial America LLC, New Holland, PA (US)

(72) Inventors: Alek Czernobil, New Holland, PA (US); Luigi Gioffre, New Holland, PA (US)

(73) Assignee: CNH Industrial America LLC, New Holland, PA (US)

(*) Notice: Subject to any disclaimer, the term of this patent is extended or adjusted under 35 U.S.C. 154(b) by 0 days.

(21) Appl. No.: 18/322,224

(22) Filed: May 23, 2023

(51) Int. Cl.
| | |
|---|---|
| *F16H 3/093* | (2006.01) |
| *B60K 17/08* | (2006.01) |
| *F16H 3/00* | (2006.01) |
| *F16H 3/10* | (2006.01) |

(52) U.S. Cl.
CPC ............ *F16H 3/093* (2013.01); *B60K 17/08* (2013.01); *F16H 3/10* (2013.01); *B60Y 2200/221* (2013.01); *F16H 2003/0938* (2013.01); *F16H 2200/0078* (2013.01); *F16H 2200/2043* (2013.01)

(58) Field of Classification Search
CPC .. F16H 3/093; F16H 3/006; F16H 2003/0938; F16H 2200/0078; F16H 2200/2043; B60K 17/08
USPC ..................................................... 74/330, 331
See application file for complete search history.

(56) References Cited

U.S. PATENT DOCUMENTS

| | | | | |
|---|---|---|---|---|
| 3,916,714 | A * | 11/1975 | Sisson | F16H 3/093 74/331 |
| 8,429,992 | B2 * | 4/2013 | Braford | F16H 3/093 74/331 |
| 8,499,657 | B2 * | 8/2013 | Sasada | F16H 3/093 74/331 |
| 8,596,157 | B2 * | 12/2013 | Vu | F16H 37/043 74/331 |
| 2018/0372188 | A1 * | 12/2018 | Hana | F16H 61/0009 |
| 2020/0393020 | A1 * | 12/2020 | Bulgrien | F16H 3/093 |
| 2020/0400216 | A1 * | 12/2020 | Sedoni | F16H 3/093 |

* cited by examiner

*Primary Examiner* — Ha Dinh Ho
(74) *Attorney, Agent, or Firm* — Rickard K. DeMille; Rebecca L. Henkel; Peter K. Zacharias

(57) ABSTRACT

A dual clutch power shift transmission is provided. The transmission includes an input shaft, a main shaft rotationally coupled to the input shaft, and an output shaft coupled to the input shaft. An odd shaft and an even shaft carry a plurality of gears. The gears define a predetermined gear ratio between the input shaft and output shaft. The odd shaft and even shaft are coupled to the input shaft via an odd clutch, and even clutch, and a master clutch. A forward clutch and a reverse clutch are interposed between the master clutch, odd clutch, and even clutch. The forward and reverse clutch are alternatively coupled to the input shaft. An intermediate shaft assembly, rotationally coupled to the gears, is interposed between the odd shaft and even shaft. An auxiliary shaft is interposed between the odd shaft and output shaft and carries range gears defining a predetermined gear ratio.

20 Claims, 3 Drawing Sheets

DUAL CLUTCH POWER SHIFT TRANSMISSION

BACKGROUND

The present disclosure relates generally to apparatuses and systems utilizing a dual clutch power shift transmission architecture. More specifically, the present disclosure relates to a dual clutch transmission with twenty-four forward gears and twenty-four reverse gears.

SUMMARY

One embodiment relates to a dual clutch power shift transmission for an agricultural vehicle including twenty-four reverse modes and twenty-four forward modes. The dual clutch power shift transmission includes an input shaft configured to be connected to a prime mover of the agricultural vehicle, a main shaft rotationally coupled to the input shaft, and an output shaft configured to be selectively coupled to the input shaft to translate power to a tractive assembly of the agricultural vehicle. The dual clutch power shift transmission also includes an odd shaft and an even shaft, each configured to carry a plurality of gears. The plurality of gears define a predetermined gear ratio between the input shaft and the output shaft. The odd shaft is selectively coupled to the input shaft via an odd clutch and a master clutch, and the even shaft is selectively coupled to the input shaft via an even clutch and the master clutch. A forward clutch and a reverse clutch are interposed between the master clutch and the odd clutch, and are also interposed between the master clutch and the even clutch. The forward and reverse clutch are configured to be alternatively coupled to the input shaft. An intermediate shaft assembly is interposed between the odd shaft and the even shaft. The intermediate shaft assembly rotationally couples each gear of the plurality of gears with a corresponding gear of the plurality of gears. An auxiliary shaft is interposed between the odd shaft and the output shaft. The auxiliary shaft carries a plurality of range gears. Each of the plurality of range gears defines a predetermined gear ratio between the input shaft and the output shaft.

Another embodiment relates to a dual clutch power shift transmission architecture for a vehicle. The dual clutch power shift transmission architecture includes an input shaft connected to an output of a prime mover and an output shaft configured to be selectively coupled to the input shaft to translate power to a tractive assembly of the vehicle. The transmission also includes a main shaft rotationally coupled to the input shaft. The transmission further includes a first drive shaft, a second drive shaft, an even shaft, an odd shaft, an intermediate shaft assembly, and an auxiliary shaft. The second drive shaft is coaxial to the main shaft and is rotationally coupled to the first drive shaft via an idler gear. The even shaft is coaxial with the main shaft and is configured to be selectively coupled to the second drive shaft. The odd shaft is configured to be selectively coupled to the first drive shaft. The intermediate shaft assembly is interposed between the even shaft and the odd shaft. The auxiliary shaft is interposed between the odd shaft and the output shaft. The transmission also includes a main stage. The main stage includes a master clutch configured to selectively couple the main shaft to a forward clutch or a reverse clutch. The forward clutch selectively couples the main stage to the second drive shaft, and the reverse clutch selectively couples the main stage to the first drive shaft. The transmission also includes a second stage. The second stage includes an even clutch, an odd clutch, and the idler rotationally coupling the first drive shaft to the second drive shaft. The even clutch selectively couples the second drive shaft to the even shaft. The odd clutch selectively couples the first drive shaft to the odd shaft. The transmission also includes a gear-speed stage. The gear-speed stage includes a plurality of gears and a plurality of gear connectors. Each of the plurality of gears are coaxial to the even shaft or the odd shaft. Each of the plurality of gears is also rotationally coupled to the intermediate shaft assembly. Each of the plurality of gear connectors is configured to selectively couple one or more of the plurality of gears to the even shaft or the odd shaft. The transmission also includes a ranges stage. The ranges stage includes a plurality of range gears coaxial to the auxiliary shaft. Each of the plurality of range gears is rotationally coupled with one of the plurality of gears or with the intermediate shaft assembly.

Still another embodiment relates to a dual clutch power shift transmission. The dual clutch power shift transmission includes an input shaft, an output shaft, an auxiliary shaft, a main shaft, an even shaft, an odd shaft, an intermediate shaft assembly, and a main stage assembly. The input shaft is coupled to an output of a prime mover. The output shaft is coupled to a tractive assembly. The auxiliary shaft is rotationally coupled to the output shaft and is interposed between the input shaft and the output shaft. The main shaft is rotationally coupled to the input shaft and is interposed between the input shaft and the output shaft. The even shaft is coaxial with the main shaft and is configured to be selectively coupled to a first drive shaft and a second drive shaft via an even clutch. An odd clutch is configured to selectively couple the first drive shaft and the second drive shaft to the odd shaft. The intermediate shaft assembly is interposed between the even shaft and the odd shaft. The main stage assembly includes a master clutch, a forward clutch, and a reverse clutch. The main stage assembly is configured to selectively couple the main shaft to the first drive shaft and the second drive shaft.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
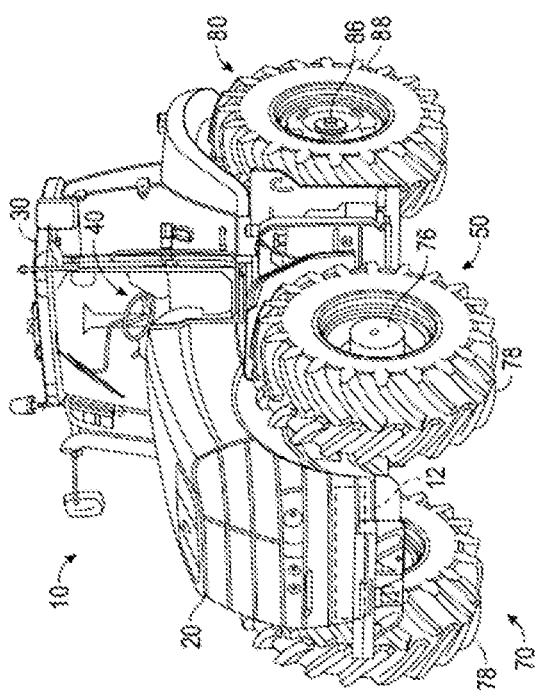
FIG. 1 is a perspective view of a vehicle, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a dual clutch power shift transmission of the present disclosure provides twenty-four forward speed and twenty-four reverse speeds with a layout that allows for single clutch swaps and equal step ratios. The twenty-four reverse gears and twenty-four forward gears are achieved by engaging eight gears of the transmission multiplied by three possible range gears. The transmission includes an input shaft that received power from a prime mover. In some embodiments, a dropbox idler of varying gear configurations (e.g., a three-gear train that steps up or steps down a gear ratio) may couple the input shaft to the transmission. In this way, the dropbox idler allows the transmission architecture to interoperate with multiple vehicles of varying engine heights and positions (e.g., by using the dropbox idler to ensure the engine output may reach the transmission input). The transmission also includes a master clutch, larger than the other clutches in the transmission, to couple the rotational energy of the main shaft to the remainder of the components. The master clutch provides energy absorption, allows the transmission to take off, and delivers power from the input shaft to an output shaft that couples to a tractive assembly of the vehicle.

The transmission further includes a main stage, generally comprising the master clutch, a forward clutch, and a reverse clutch. A main stage shaft or gear set may be interposed between the master clutch and the forward/reverse clutches. The transmission also includes a second stage, generally comprising an idler gear, an even clutch, and an odd clutch. The forward clutch, even clutch, reverse clutch, and odd clutch selectively engage and disengage (e.g., rotationally couple with) a first drive shaft and a second drive shaft that span across the main stage and the second stage. The even clutch also selectively engages with an even shaft that may be coaxial to the main shaft. The odd clutch selectively engages with an odd shaft. In other embodiments, the odd shaft may be coaxial to the main shaft. A plurality of gears are arranged on (e.g., are positioned coaxial to, rotate around, etc.) the even shaft and the odd shaft. In some embodiments, the plurality of gears includes eight gears of varying diameter. A plurality of gear connectors selectively engages one or more of the plurality of gears to the even shaft or the odd shaft to adjust the power flow through the transmission and to alter the effective gear ratio. An intermediate shaft assembly is interposed between the even shaft, the odd shaft, and the plurality of gears. The intermediate shaft assembly comprises three separate inertial components which include an intermediate shaft, a first intermediate support shaft, and a second intermediate support shaft. A plurality of intermediate connectors selectively couples the components of the intermediate shaft assembly together. Further, an auxiliary shaft is interposed between the odd shaft (or in some embodiments the even shaft) and the output shaft. A plurality of range gears is arranged upon (e.g., is coaxial to, rotate around, etc.) the auxiliary shaft. The clutches and connectors may be selectively engaged to provide for twenty-four reverse modes and twenty-four forward modes by engaging the eight gears in combination with the three range gears.

Overall Vehicle

Figure 2:
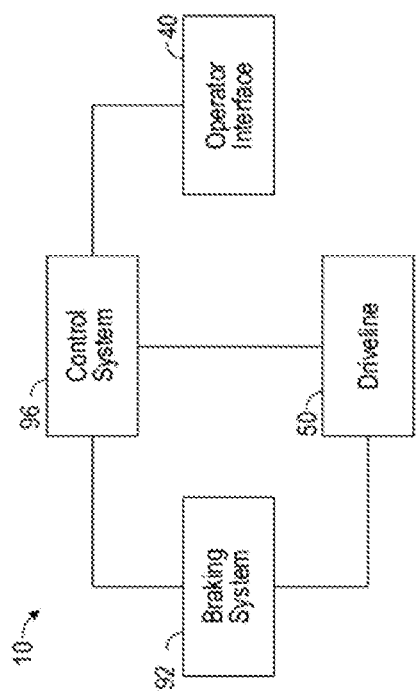
FIG. 2 is a schematic block diagram of the vehicle of FIG. 1, according to an exemplary embodiment.
Figure 3:
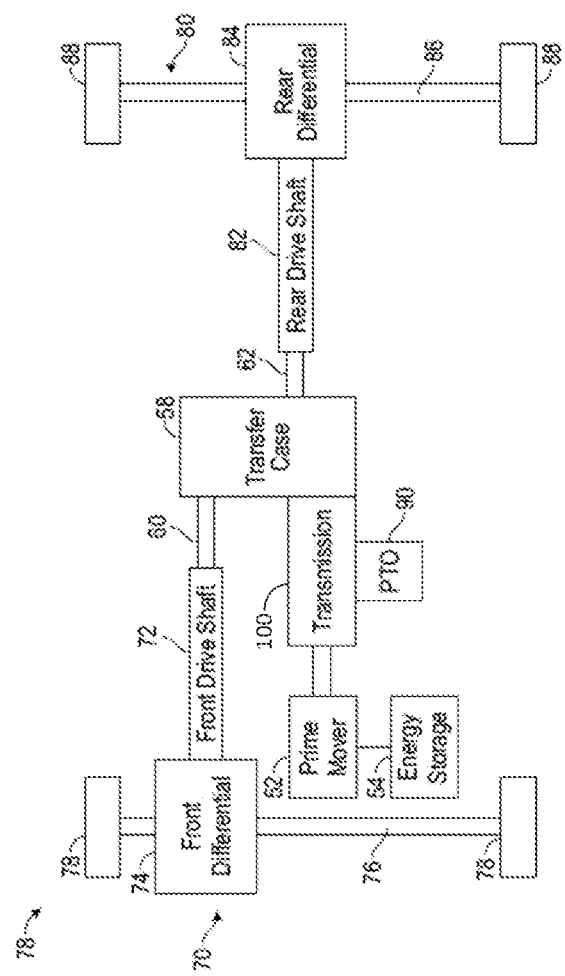
FIG. 3 is a schematic block diagram of a driveline of the vehicle of FIG. 1, according to an exemplary embodiment.

According to the exemplary embodiment shown in FIGS. 1-3, a machine or vehicle, shown as vehicle 10, includes a chassis, shown as frame 12; a body assembly, shown as body 20, coupled to the frame 12 and having an occupant portion or section, shown as cab 30; operator input and output devices, shown as operator interface 40, that are disposed within the cab 30; a drivetrain, shown as driveline 50, coupled to the frame 12 and at least partially disposed under the body 20; a vehicle braking system, shown as braking system 92, coupled to one or more components of the driveline 50 to facilitate selectively braking the one or more components of the driveline 50; and a vehicle control system, shown as control system 96, coupled to the operator interface 40, the driveline 50, and the braking system 92. In other embodiments, the vehicle 10 includes more or fewer components.

The chassis of the vehicle 10 may include a structural frame (e.g., the frame 12) formed from one or more frame members coupled to one another (e.g., as a weldment). Additionally or alternatively, the chassis may include a portion of the driveline 50. By way of example, a component of the driveline 50 (e.g., the transmission 100) may include a housing of sufficient thickness to provide the component with strength to support other components of the vehicle 10.

According to an exemplary embodiment, the vehicle 10 is an off-road machine or vehicle. In some embodiments, the off-road machine or vehicle is an agricultural machine or vehicle such as a tractor, a telehandler, a front loader, a combine harvester, a grape harvester, a forage harvester, a sprayer vehicle, a speedrower, and/or another type of agricultural machine or vehicle. In some embodiments, the off-road machine or vehicle is a construction machine or vehicle such as a skid steer loader, an excavator, a backhoe loader, a wheel loader, a bulldozer, a telehandler, a motor grader, and/or another type of construction machine or vehicle. In some embodiments, the vehicle 10 includes one or more attached implements and/or trailed implements such as a front mounted mower, a rear mounted mower, a trailed mower, a tedder, a rake, a baler, a plough, a cultivator, a rotavator, a tiller, a harvester, and/or another type of attached implement or trailed implement.

According to an exemplary embodiment, the cab 30 is configured to provide seating for an operator (e.g., a driver, etc.) of the vehicle 10. In some embodiments, the cab 30 is configured to provide seating for one or more passengers of the vehicle 10. According to an exemplary embodiment, the operator interface 40 is configured to provide an operator with the ability to control one or more functions of and/or provide commands to the vehicle 10 and the components thereof (e.g., turn on, turn off, drive, turn, brake, engage various operating modes, raise/lower an implement, etc.). The operator interface 40 may include one or more displays and one or more input devices. The one or more displays may be or include a touchscreen, a LCD display, a LED display, a speedometer, gauges, warning lights, etc. The one or more input device may be or include a steering wheel, a joystick, buttons, switches, knobs, levers, an accelerator pedal, a brake pedal, etc.

According to an exemplary embodiment, the driveline 50 is configured to propel the vehicle 10. As shown in FIG. 3, the driveline 50 includes a primary driver, shown as prime mover 52, and an energy storage device, shown as energy storage 54. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system.

As shown in FIG. 3, the driveline 50 includes a dual clutch power shift transmission, shown as transmission 100, coupled to the prime mover 52; a power divider, shown as transfer case 58, coupled to the transmission 100; a first tractive assembly, shown as front tractive assembly 70, coupled to a first output of the transfer case 58, shown as front output 60; and a second tractive assembly, shown as rear tractive assembly 80, coupled to a second output of the transfer case 58, shown as rear output 62. According to an exemplary embodiment, the transmission 100 has a variety of configurations (e.g., gear ratios, etc.) and provides different output speeds relative to a mechanical input received thereby from the prime mover 52. According to an exemplary embodiment, the transfer case 58 is configured to facilitate driving both the front tractive assembly 70 and the rear tractive assembly 80 with the prime mover 52 to facilitate front and rear drive (e.g., an all-wheel-drive vehicle, a four-wheel-drive vehicle, etc.). In some embodiments, the transfer case 58 facilitates selectively engaging rear drive only, front drive only, and both front and rear drive simultaneously. In some embodiments, the transmission 100 and/or the transfer case 58 facilitate selectively disengaging the front tractive assembly 70 and the rear tractive assembly 80 from the prime mover 52 (e.g., to permit free movement of the front tractive assembly 70 and the rear tractive assembly 80 in a neutral mode of operation). In some embodiments, the driveline 50 does not include the transfer case 58. In such embodiments, the prime mover 52 or the transmission 100 may directly drive the front tractive assembly 70 (i.e., a front-wheel-drive vehicle) or the rear tractive assembly 80 (i.e., a rear-wheel-drive vehicle).

As shown in FIGS. 1 and 3, the front tractive assembly 70 includes a first drive shaft, shown as front drive shaft 72, coupled to the front output 60 of the transfer case 58; a first differential, shown as front differential 74, coupled to the front drive shaft 72; a first axle, shown front axle 76, coupled to the front differential 74; and a first pair of tractive elements, shown as front tractive elements 78, coupled to the front axle 76. In some embodiments, the front tractive assembly 70 includes a plurality of front axles 76. In some embodiments, the front tractive assembly 70 does not include the front drive shaft 72 or the front differential 74 (e.g., a rear-wheel-drive vehicle). In some embodiments, the front drive shaft 72 is directly coupled to the transmission 100 (e.g., in a front-wheel-drive vehicle, in embodiments where the driveline 50 does not include the transfer case 58, etc.) or the prime mover 52 (e.g., in a front-wheel-drive vehicle, in embodiments where the driveline 50 does not include the transfer case 58 or the transmission 100, etc.). The front axle 76 may include one or more components.

As shown in FIGS. 1 and 3, the rear tractive assembly 80 includes a second drive shaft, shown as rear drive shaft 82, coupled to the rear output 62 of the transfer case 58; a second differential, shown as rear differential 84, coupled to the rear drive shaft 82; a second axle, shown rear axle 86, coupled to the rear differential 84; and a second pair of tractive elements, shown as rear tractive elements 88, coupled to the rear axle 86. In some embodiments, the rear tractive assembly 80 includes a plurality of rear axles 86. In some embodiments, the rear tractive assembly 80 does not include the rear drive shaft 82 or the rear differential 84 (e.g., a front-wheel-drive vehicle). In some embodiments, the rear drive shaft 82 is directly coupled to the transmission 100 (e.g., in a rear-wheel-drive vehicle, in embodiments where the driveline 50 does not include the transfer case 58, etc.) or the prime mover 52 (e.g., in a rear-wheel-drive vehicle, in embodiments where the driveline 50 does not include the transfer case 58 or the transmission 100, etc.). The rear axle 86 may include one or more components. According to the exemplary embodiment shown in FIG. 1, the front tractive elements 78 and the rear tractive elements 88 are structured as wheels. In other embodiments, the front tractive elements 78 and the rear tractive elements 88 are otherwise structured (e.g., tracks, etc.). In some embodiments, the front tractive elements 78 and the rear tractive elements 88 are both steerable. In other embodiments, only one of the front tractive elements 78 or the rear tractive elements 88 is steerable. In still other embodiments, both the front tractive elements 78 and the rear tractive elements 88 are fixed and not steerable.

In some embodiments, the driveline 50 includes a plurality of prime movers 52. By way of example, the driveline 50 may include a first prime mover 52 that drives the front tractive assembly 70 and a second prime mover 52 that drives the rear tractive assembly 80. By way of another example, the driveline 50 may include a first prime mover 52 that drives a first one of the front tractive elements 78, a second prime mover 52 that drives a second one of the front tractive elements 78, a third prime mover 52 that drives a first one of the rear tractive elements 88, and/or a fourth prime mover 52 that drives a second one of the rear tractive elements 88. By way of still another example, the driveline 50 may include a first prime mover that drives the front tractive assembly 70, a second prime mover 52 that drives a first one of the rear tractive elements 88, and a third prime mover 52 that drives a second one of the rear tractive elements 88. By way of yet another example, the driveline 50 may include a first prime mover that drives the rear tractive assembly 80, a second prime mover 52 that drives a first one of the front tractive elements 78, and a third prime mover 52 that drives a second one of the front tractive elements 78.

As shown in FIG. 3, the driveline 50 includes a power-take-off ("PTO"), shown as PTO 90. While the PTO 90 is shown as being an output of the transmission 100, in other embodiments the PTO 90 may be an output of the prime mover 52, the transmission 100, and/or the transfer case 58. According to an exemplary embodiment, the PTO 90 is configured to facilitate driving an attached implement and/or a trailed implement of the vehicle 10. In some embodiments, the driveline 50 includes a PTO clutch positioned to selectively decouple the driveline 50 from the attached implement and/or the trailed implement of the vehicle 10 (e.g., so that the attached implement and/or the trailed implement is only operated when desired, etc.).

According to an exemplary embodiment, the braking system 92 includes one or more brakes (e.g., disc brakes, drum brakes, in-board brakes, axle brakes, etc.) positioned to facilitate selectively braking (i) one or more components of the driveline 50 and/or (ii) one or more components of a trailed implement. In some embodiments, the one or more brakes include (i) one or more front brakes positioned to facilitate braking one or more components of the front tractive assembly 70 and (ii) one or more rear brakes positioned to facilitate braking one or more components of the rear tractive assembly 80. In some embodiments, the one or more brakes include only the one or more front brakes. In some embodiments, the one or more brakes include only the one or more rear brakes. In some embodiments, the one or more front brakes include two front brakes, one positioned to facilitate braking each of the front tractive elements 78. In some embodiments, the one or more front brakes include at least one front brake positioned to facilitate braking the front axle 76. In some embodiments, the one or more rear brakes include two rear brakes, one positioned to facilitate braking each of the rear tractive elements 88. In some embodiments, the one or more rear brakes include at least one rear brake positioned to facilitate braking the rear axle 86. Accordingly, the braking system 92 may include one or more brakes to facilitate braking the front axle 76, the front tractive elements 78, the rear axle 86, and/or the rear tractive elements 88. In some embodiments, the one or more brakes additionally include one or more trailer brakes of a trailed implement attached to the vehicle 10. The trailer brakes are positioned to facilitate selectively braking one or more axles and/or one or more tractive elements (e.g., wheels, etc.) of the trailed implement.

Dual Clutch Transmission (Dual Drive) Architecture

Figure 4:
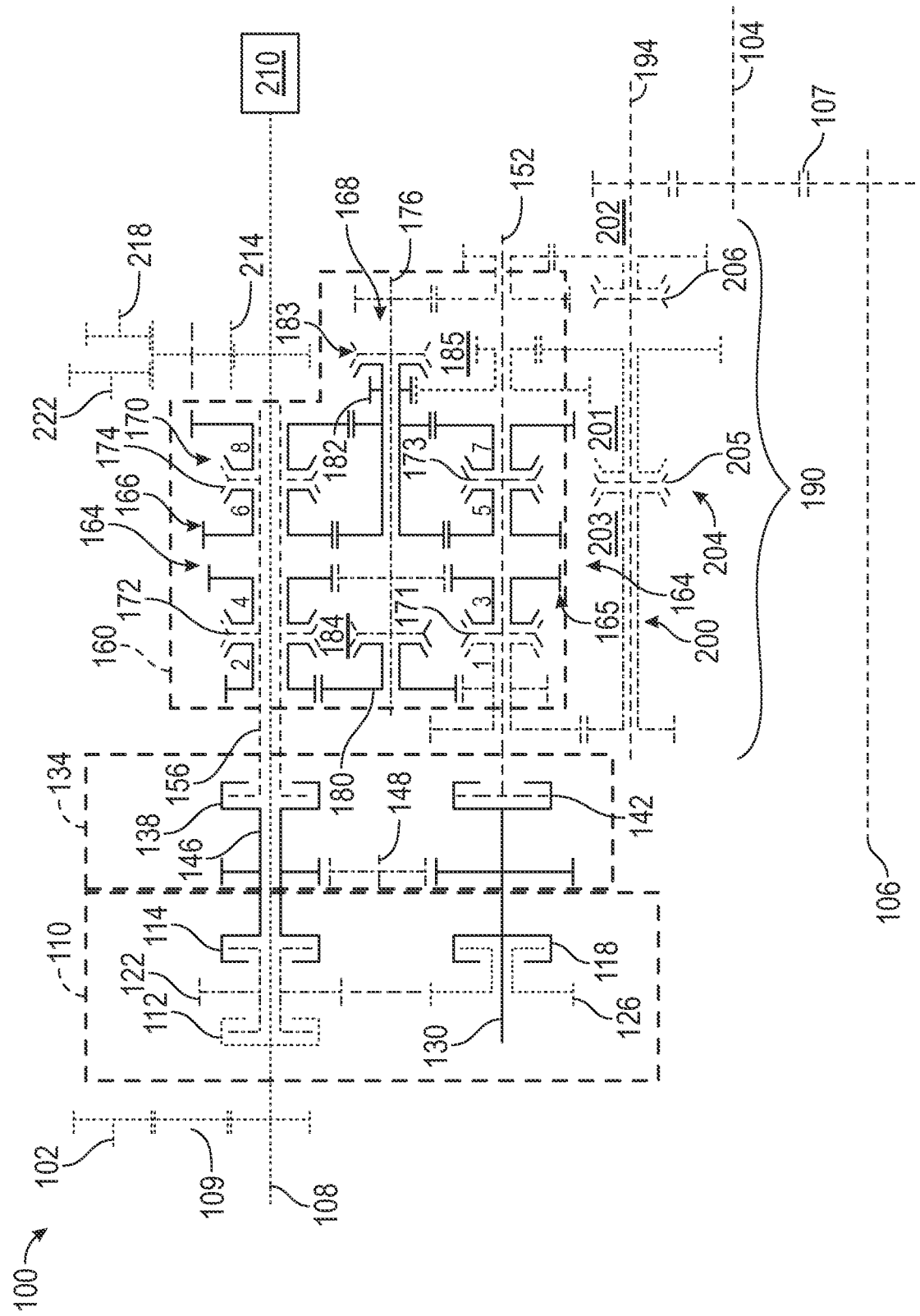
FIG. 4 is a kinematic diagram of a transmission, according to an exemplary embodiment.

FIG. 4 discloses a dual clutch power shift transmission 100 for a vehicle 10. The transmission 100 includes an input shaft 102 configured to be operatively coupled to an output of the prime mover 52. The input shaft 102 receives power/rotational energy from the prime mover 52 and translates the same to a first output shaft 104. The first output shaft 104 may be connected to the drive system of the vehicle 10. For example, in some embodiments, the first output shaft 104 is coupled to the rear tractive assembly 80 (e.g., the rear drive shaft 82, the rear output 62, the rear differential 84, the rear axle 86, etc.). In other embodiments, the input shaft 102 also translates power/rotational energy to a second output shaft 106. The second output shaft 106 is coupled to the front tractive assembly 70 (e.g., the front drive shaft 72, the front output 60, the front differential 74, the front drive shaft 72, the front axle 76, etc.). The first output shaft 104 and the second output shaft 106 may be rotationally coupled, for example, by intermeshed gears 107 (e.g., toothed wheels, spur gears, helical gears, etc.). In other embodiments, the input shaft 102 may be configured to translate rotational power to a single output shaft (e.g., the first output shaft 104 and the second output shaft 106 are combined and provide power via one shaft to the tractive assembly of the vehicle 10, etc.).

The transmission 100 also includes a main shaft 108 rotationally coupled to the input shaft 102. In some embodiments, the main shaft 108 is coupled to the input shaft 102 via a dropbox idler 109. The dropbox idler 109 is a gear train assembly (e.g., a three-gear train) that speeds up or slows down the rotation between the input shaft 102 and the main shaft 108 by a predefined gear ratio. The dropbox idler 109 is also configured to connect the input shaft 102 to the main shaft 108 across vehicles 10 of varying size, engine heights, with differing prime mover 52 placements, etc. In this way, the dropbox idler 109 allows the transmission 100 to be installed in vehicles 10 with different prime mover 52 placements. The dropbox idler 109 also allows for the components of the driveline to experience less torque, increased speed, etc. based on the predefined gear ratio between the input shaft 102 and the main shaft 108.

The transmission 100 also includes a main stage 110. The main stage 110 includes a master clutch 112, a forward clutch 114, a reverse clutch 118, a first main stage shaft 122, and a second main stage shaft 126, a first drive shaft 130 and/or a second drive shaft 146. The first main stage shaft 122 and the second main stage shaft 126 are mechanically coupled together. For example, the first main stage shaft 122 and the second main stage shaft 126 may be rotationally coupled (e.g., connected by intermeshed gears, connected by toothed wheels, transmit rotational energy between each other, etc.). The master clutch 112 is selectively engagable with the first main stage shaft 122 (e.g., may be selectively actuated to rotationally couple with the first main stage shaft 122, may be alternatively coupled and decoupled from the first main stage shaft 122, etc.). Engaging the master clutch 112 with the first main stage shaft 122 rotationally couples the master clutch 112 with the first main stage shaft 122 and the second main stage shaft 126, via the mechanical coupling shared between the first main stage shaft 122 and the second main stage shaft 126. In some embodiments, the first main stage shaft 122 and the second main stage shaft 126 may include a main stage gear assembly, a gear train, a gear and bearing system, etc.

The main stage shaft 122 is coaxial to the main shaft 108 and rotates freely around the main shaft 108 until coupled to the main shaft 108 via the master clutch 112. The master clutch 112 allows the transmission to take off (e.g., receive the rotational power from the prime mover 52, operate the vehicle 10 in forward and reverse motion, changing from a park condition of a vehicle 10 to shifting of a shuttle lever from parking to unbreak, etc.) and is sized to absorb the energy of a shuttle shift of the vehicle 10 (e.g., is a larger size than the other clutches in the transmission 100). The rotational energy from the prime mover 52 transfers primarily from the main shaft 108 to the first output shaft 104 and/or second output shaft 106 via the master clutch 112. The second main stage shaft 126 is coaxial to the first drive shaft 130 and may rotate freely around the first drive shaft 130 until engaged by the reverse clutch 118, which is configured to selectively engage or disengage with the second main stage shaft 126. The forward clutch 114 is configured to selectively engage or disengage with the first main stage shaft 122, selectively coupling the first main stage shaft 122 with the second drive shaft 146. While the forward clutch 114 is engaged with the first main stage shaft 122 (e.g., the first main stage shaft 122 and the second drive shaft 146 are rotationally coupled via the forward clutch 114), and the reverse clutch 118 is disengaged with the second main stage shaft 126, the vehicle 10 is configured to operate in a mode of forward motion. While the forward clutch 114 is disengaged with the first main stage shaft 122, and the reverse clutch 118 is engaged with the second main stage shaft 126 (e.g., the second main stage shaft 126 is rotationally coupled to the first drive shaft 130 via the reverse clutch 118), the vehicle 10 is configured to operate in a mode of reverse motion.

The transmission 100 further includes a second stage 134. The second stage 134 includes an even clutch 138, an odd clutch 142, and an idler 148. The second stage 134 is configured to be selectively coupled to the main stage 110 via the first drive shaft 130 and/or a second drive shaft 146. For example, the second stage 134 may be coupled to the main stage 110 by alternating engagement of the forward clutch 114 or the reverse clutch 118. The idler 148 rotationally couples the first drive shaft 130 to the second drive shaft 146. The second drive shaft 146 is coaxial to the main shaft 108 and may rotate freely around the main shaft 108 until coupled to the main shaft 108 via the master clutch 112 and the forward clutch 114, or until coupled to the main shaft 108 via the master clutch 112, the reverse clutch 118, and the idler 148. The odd clutch 142 is configured to selectively couple the first drive shaft 130 to an odd shaft 152. Similarly, the even clutch 138 is configured to selectively couple the second drive shaft 146 to an even shaft 156.

The transmission 100 also includes an gear-speed stage 160. The gear-speed stage 160 includes the odd shaft 152, the even shaft 156, a plurality of gears 164, an intermediate shaft assembly 168 (i.e., a dual-drive stage), and a plurality of gear connectors 170 (e.g., synchronizers, semi-synchronizers, etc.). For example, in FIG. 4, the exemplary embodiment includes four synchronizers in the plurality of gear connectors 170 (e.g., a first synchronizer 171, a second synchronizer 172, a third synchronizer 173, and a fourth synchronizer 174). Also in the particular embodiment shown in FIG. 4, the gear-speed stage 160 includes eight gears of varying diameter, each configured to adjust the rotational speed of the transmission 100 by a respective ratio, from a smallest ratio to a largest ratio. In other embodiments, the plurality of gears may each have the same or a different diameter, further more or less gears may be used.

As shown in FIG. 4, the plurality of gears 164 includes two groups of gears, a first group 165 (e.g., a first gear 1, a third gear 3, a fifth gear 5, and a seventh gear 7) coaxial to the odd shaft 152 and a second group 166 (e.g., a second gear 2, a fourth gear 4, a sixth gear 6, and an eighth gear 8) coaxial to the even shaft 156 and/or the main shaft 108. The first group 165 of gears may have different sizes relative to one another and each be freely rotatable around the odd shaft 152 (e.g., connected via bearings) so that they are not required to rotate to the same speed of the odd shaft 152, even shaft 156 and/or the main shaft 108 unless selectively coupled to the odd shaft 152, even shaft 156, and/or main shaft 108 via a connection including at least one of the plurality of gear connectors 170. For example, the first gear 1 may have a largest diameter, and the seventh gear 7 may have a smallest diameter, with the third gear 3 and the fifth gear 5 having respective diameters between the sizes of the first gear 1 and the seventh gear 7.

Similarly, the second group 166 of gears may have different sizes relative to one another and each be freely rotatable around the even shaft and/or the main shaft 108 so that they are not required to rotate to the same speed of the odd shaft 152, the even shaft 156, and/or the main shaft 108 unless selectively coupled to the odd shaft 152, the even shaft 156, and/or the main shaft 108 via a connection including at least one of the plurality of gear connectors 170. For example, the second gear 2 may have a largest diameter, and the eighth gear 8 may have a smallest diameter, with the fourth gear 4 and the sixth gear 6 having respective diameters between the sizes of the second gear 2 and the eighth gear 8.

Each of the plurality of gears 164, when selected, implement a different gear speed ratio of the transmission 100. For example, a first speed ratio occurs when selecting the first gear 1 via the first synchronizer 171, a second speed ratio when selecting the second gear 2 via the second synchronizer 172, a third speed ratio when selecting the third gear 3 via the first synchronizer 171, a fourth speed ratio when selecting the fourth gear 4 via the second synchronizer 172, a fifth speed ratio when selecting the fifth gear 5 via the third synchronizer 173, a sixth speed ratio when selecting the sixth gear 6 via the fourth synchronizer 174, a seventh speed ratio when selecting the seventh gear 7 via the third synchronizer 173, and an eighth speed ratio when selecting the eighth gear 8 via the fourth synchronizer 174. By interposing a respective synchronizer, semi-synchronizer, connector, etc. between an adjacent pair of gears, that connector may selectively engage and disengage that respective gear to select a given speed ratio (e.g., the first synchronizer 171 is interposed between the first gear 1 and the third gear 3, and may selectively engage either the first speed ratio or the third speed ratio or neither).

Each of the connectors in the plurality of gear connectors 170 is configured to selectively engage one or more gears with either the odd shaft 152 or the even shaft 156. For example, as shown in FIG. 4, the first synchronizer 171 is configured to selectively couple either the first gear 1 or the third gear 3 to the odd shaft 152. Similarly, the second synchronizer 172 is configured to selectively couple either the second gear 2 or the fourth gear 4 with the even shaft 156. Similarly, the third synchronizer 173 is configured to selectively couple either the fifth gear 5 or the seventh gear 7 to the odd shaft 152, and the fourth synchronizer 174 is configured to selectively couple either the sixth gear 6 or the eighth gear 8 to the even shaft 156.

The gear-speed stage 160 includes an intermediate shaft assembly 168 interposed between the odd shaft 152, the even shaft 156, and/or the main shaft 108. In this way, the teeth of each of the plurality of gears 164 are intermeshed with corresponding teeth of gears on the intermediate shaft assembly 168. The intermediate shaft assembly 168 includes an intermediate shaft 176, a first intermediate support shaft 180, a second intermediate support shaft 182, and a plurality of intermediate connectors 183 (e.g., synchronizers, semi-synchronizers, etc.). For example, in FIG. 4, the plurality of intermediate connectors 183 includes first intermediate connector 184 and second intermediate connector 185. The first intermediate support shaft 180 and the second intermediate support shaft 182 are each coaxial with the intermediate shaft 176. The first intermediate support shaft 180 is configured to rotate freely around the intermediate shaft 176 until coupled to the intermediate shaft 176 via one of the plurality of intermediate connectors 183 (here, first intermediate connector 184). Similarly, the second intermediate support shaft 182 is configured to rotate freely about the intermediate shaft 176 until coupled to the intermediate shaft 176 by one of the plurality of intermediate connectors 183 (here, second intermediate connector 185). In this way, the intermediate shaft assembly 168 is divisible into three rotational components which may be selectively coupled and decoupled from one another (e.g., the intermediate shaft 176, the first intermediate support shaft 180, and the second intermediate support shaft 182).

The first intermediate support shaft 180 includes one or more gears that intermesh with the teeth of one or more of the plurality of gears 164. For example, as shown in FIG. 4, the teeth of the first intermediate support shaft 180 intermesh with the teeth of the first gear 1 and the second gear 2. Similarly, the second intermediate support shaft 182 includes one or more toothed wheels that intermesh with the teeth of one or more of the plurality of gears 164. For example, as shown in FIG. 4, the teeth of the second intermediate support shaft 182 intermesh with the fifth gear 5, the sixth gear 6, the seventh gear 7 and the eighth gear 8. The intermediate shaft 176 may also include one or more toothed wheels that intermesh with one or more of the plurality of gears 164. For example, as shown in FIG. 4, the teeth of the intermediate shaft 176 intermesh with the third gear 3 and the fourth gear 4. The toothed wheels of the intermediate shaft 176 are rotationally fixed to the intermediate shaft 176. Similarly, the toothed wheels of the first intermediate support shaft 180 are rotationally fixed to the first intermediate support shaft 180. Also, the toothed wheels of the second intermediate support shaft 182 are rotationally fixed to the second intermediate support shaft 182.

The transmission 100 also includes a ranges stage 190. The ranges stage 190 includes an auxiliary shaft 194, a plurality of range gears 200 (e.g., a slow gear 201, a medium gear 202, and a fast gear 203, etc.), and a plurality of range connectors 204 (e.g. synchronizers, semi-synchronizers, etc.). The auxiliary shaft 194 is interposed between the odd shaft 152 and the first output shaft 104. Each of the plurality of range gears 200 are coaxial with the auxiliary shaft 194 are may rotate freely relative to the auxiliary shaft 194, until coupled to the auxiliary shaft 194. The plurality of range connectors 204 are configured to selectively couple the plurality of range gears 200 to the auxiliary shaft 194. In some embodiments, each of the range connectors 204 may selectively couple one or more of the plurality of range gears 200 to the auxiliary shaft 194.

The ranges stage 190 is configured to couple the auxiliary shaft 194 to the gear-speed stage 160 by choosing in between a plurality of gear ratios which are multiplied by the above described ratios in the gear-speed stage 160. For example, as shown in FIG. 4, one of the plurality of range connectors 204, here the first range connector 205, is configured to selectively couple either the slow gear 201 or the fast gear 203 to the auxiliary shaft 194. Similarly, another of the plurality of range connectors 204, here the second range connector 206, is configured to selectively couple the medium gear 202 to the auxiliary shaft 194. Each of the plurality of range gears 200 are intermeshed with a corresponding toothed wheel coaxial to the odd shaft 152. The corresponding toothed wheels coaxial to the odd shaft 152 are further intermeshed with toothed wheels of the intermediate shaft assembly 168. For example, as shown in the embodiment of FIG. 4, the toothed wheel of the slow gear 201 is intermeshed with a corresponding toothed wheel coaxial to the odd shaft 152, which itself is intermeshed with a toothed wheel of the intermediate shaft assembly 168 (e.g., a toothed wheel of the second intermediate support shaft 182). Similarly, the toothed wheel of the medium gear 202 is intermeshed with a corresponding toothed wheel coaxial to the odd shaft 152, which itself is intermeshed with a toothed wheel of the intermediate shaft assembly 168 (e.g., a toothed wheel of the intermediate shaft 176). Similarly, the toothed wheel of the fast gear 203 is intermeshed with a toothed wheel coaxial with the odd shaft 152 (e.g., a toothed wheel rotationally coupled to the first gear 1), which itself is intermeshed with a toothed wheel of the intermediate shaft assembly 168 (e.g., a toothed wheel of the first intermediate support shaft 180).

In this way, the transmission 100 provides twenty-four possible gear ratios in forward operation, due to the eight ratios present in the gear-speed stage 160 repeated over the three ratios present in the ranges stage 190 while the forward clutch 114 is engaged. Similarly, the transmission 100 provides twenty-four possible gear ratios in reverse operation, due to the eight ratios available in the gear-speed stage 160 ratios repeated over the three ratios available in the ranges stage 190 while the reverse clutch 118 is engaged.

Exemplary Embodiment Power Flow—Twenty Four Forward Modes, Twenty Four Reverse Modes From the above architecture, it is apparent that upshifting and downshifting may take place along the entire list of possible total gear ratios between the input shaft 102 and the first output shaft 104 and/or the second output shaft 106.

For example, a first set of eight ratios may occur by engaging the first gear 1 through the eighth gear 8 across the range associated with the slow gear 201. Before the master clutch is engaged, the input shaft 102 and main shaft 108 rotate relative to each other (and may be at differing speeds given the ratio of the dropbox idler 109 connection). To operate the transmission 100 at a first gear slow operation, the master clutch 112 is engaged, transferring rotational energy to the first main stage shaft 122 and the second main stage shaft 126. For a forward first gear slow operation, the forward clutch 114 is engaged and the reverse clutch 118 is disengaged, transferring rotational energy associated with a forward operation to the second drive shaft 146 then the first drive shaft 130 (via the idler 148). Similarly, for a reverse first gear slow operation, instead, the reverse clutch is engaged and the forward clutch is disengaged, transferring rotational energy associated with a reverse operation to the first drive shaft 130 then the second drive shaft 146 (via the idler 148). The respective forward or reverse first gear slow operation occurs by engaging the odd clutch 142 to couple the odd shaft 152 with the first drive shaft 130; engaging the first synchronizer 171 to couple the first gear 1 to the odd shaft 152; engaging the first intermediate connector 184 to couple the first intermediate support shaft 180 to the intermediate shaft 176; engaging the second intermediate connector 185 to couple the second intermediate support shaft 182 to the intermediate shaft 176; and engaging the first range connector 205 to couple the slow gear 201 to the auxiliary shaft 194. Power then flows from the input shaft 102 to the first output shaft 104 and/or the second output shaft 106 in the first gear slow operation. For the forward and reverse first gear slow operations, the even clutch 138 is disengaged. The second gear slow operation may be preselected by engaging the second synchronizer 172 to couple the second gear 2 to the even shaft 156. The transmission 100 then allows for a performance of a powershift from the odd clutch 142 to the even clutch 138 (e.g., disengaging the odd clutch 142 and engaging the even clutch 138) to switch from the first gear slow operation to the second gear slow operation.

To operate the transmission 100 at the second gear slow operation, the master clutch 112 is likewise engaged. Similarly, for a forward or reverse second gear slow operation, the forward clutch 114 or the reverse clutch 118 is selectively engaged, transferring rotational energy associated with the respective operation to the first drive shaft 130, the second drive shaft 146, and the idler 148. The respective forward or reverse second gear slow operation occurs by engaging the even clutch 138 to couple the even shaft 156 with the second drive shaft 146; engaging the second synchronizer 172 to couple the second gear 2 to the even shaft 156; engaging the first intermediate connector 184 to couple the first intermediate support shaft 180 to the intermediate shaft 176; engaging the second intermediate connector 185 to couple the second intermediate support shaft 182 to the intermediate shaft 176; and engaging the first range connector 205 to couple the slow gear 201 to the auxiliary shaft 194. Power then flows from the input shaft 102 to the first output shaft 104 and/or the second output shaft 106 in the second gear slow operation. For the forward and reverse second gear slow operations, the odd clutch 142 is disengaged. The third gear slow operation may be preselected by engaging the first synchronizer 171 to couple the third gear 3 to the odd shaft 152. The transmission 100 then allows for a performance of a powershift from the even clutch 138 to the odd clutch 142 (e.g., disengaging the even clutch 138 and engaging the odd clutch 142) to switch from the second gear slow operation to the third gear slow operation.

To operate the transmission 100 at a third gear slow operation, the master clutch 112 is likewise engaged. Similarly, for a forward or reverse third gear slow operation, the forward clutch 114 or the reverse clutch 118 is selectively engaged. The respective forward or reverse third gear slow operation occurs by engaging the odd clutch 142 to couple the odd shaft 152 with the first drive shaft 130; engaging the first synchronizer 171 to couple the third gear 3 to the odd shaft 152; in this embodiment, the third gear 3 is intermeshed with a fixed toothed wheel coupled to the intermediate shaft 176, thus the first intermediate connector 184 is disengaged. However, engaging the second intermediate connector 185 couples the second intermediate support shaft 182 to the intermediate shaft 176; and engaging the first range connector 205 couples the slow gear 201 to the auxiliary shaft 194. Power then flows from the input shaft 102 to the first output shaft 104 and/or the second output shaft 106 in the third gear slow operation. For the forward and reverse third gear slow operations, the even clutch 138 is disengaged. The fourth gear slow operation may be preselected by engaging the second synchronizer 172 to couple the fourth gear 4 to the even shaft 156. The transmission 100 then allows for a performance of a powershift from the odd clutch 142 to the even clutch 138 (e.g., disengaging the odd clutch 142 and engaging the even clutch 138) to switch from the third gear slow operation to the fourth gear slow operation.

To operate the transmission 100 at the fourth gear slow operation, the master clutch 112 is likewise engaged. Similarly, for a forward or reverse fourth gear slow operation, the forward clutch 114 or the reverse clutch 118 is selectively engaged, transferring rotational energy associated with the respective operation to the first drive shaft 130, the second drive shaft 146, and the idler 148. The respective forward or reverse fourth gear slow operation occurs by engaging the even clutch 138 to couple the even shaft 156 with the second drive shaft 146; engaging the second synchronizer 172 to couple the fourth gear 4 to the even shaft 156; disengaging the first intermediate connector 184 because the fourth gear 4 is intermeshed with a toothed wheel of the intermediate shaft 176; engaging the second intermediate connector 185 to couple the second intermediate support shaft 182 to the intermediate shaft 176; and engaging the first range connector 205 to couple the slow gear 201 to the auxiliary shaft 194. Power then flows from the input shaft 102 to the first output shaft 104 and/or the second output shaft 106 in the fourth gear slow operation. For the forward and reverse fourth gear slow operations, the odd clutch 142 is disengaged. The fifth gear slow operation may be preselected by engaging the third synchronizer 173 to couple the fifth gear 5 to the odd shaft 152. The transmission 100 then allows for a performance of a powershift from the even clutch 138 to the odd clutch 142 (e.g., disengaging the even clutch 138 and engaging the odd clutch 142) to switch from the fourth gear slow operation to the fifth gear slow operation.

To operate the transmission 100 at the fifth gear slow operation, the master clutch 112 is likewise engaged. Similarly, for a forward or reverse fifth gear slow operation, the forward clutch 114 or the reverse clutch 118 is selectively engaged. The respective forward or reverse fifth gear slow operation occurs by engaging the odd clutch 142 to couple the odd shaft 152 with the first drive shaft 130; engaging the third synchronizer 173 to couple the fifth gear 5 to the odd shaft 152; in this embodiment, the fifth gear 5 is intermeshed with a fixed toothed wheel coupled to the second intermediate support shaft 182, which is intermeshed with the corresponding toothed wheel of the slow gear 201. Engaging the first range connector 205 couples the slow gear 201 to the auxiliary shaft 194. Power then flows from the input shaft 102 to the first output shaft 104 and/or the second output shaft 106 in the fifth gear slow operation. For the forward and reverse fifth gear slow operations, the even clutch 138 is disengaged. The sixth gear slow operation may be preselected by engaging the fourth synchronizer 174 to couple the sixth gear 6 to the even shaft 156. The transmission 100 then allows for a performance of a powershift from the odd clutch 142 to the even clutch 138 (e.g., disengaging the odd clutch 142 and engaging the even clutch 138) to switch from the fifth gear slow operation to the sixth gear slow operation.

To operate the transmission 100 at the sixth gear slow operation, the master clutch 112 is likewise engaged. Similarly, for a forward or reverse sixth gear slow operation, the forward clutch 114 or the reverse clutch 118 is selectively engaged. The respective forward or reverse sixth gear slow operation occurs by engaging the even clutch 138 to couple the even shaft 156 with the second drive shaft 146; engaging the fourth synchronizer 174 to couple the sixth gear 6 to the even shaft 156. The sixth gear 6 is intermeshed with a toothed wheel of the second intermediate support shaft 182, which is likewise intermeshed with a toothed wheel of the gear corresponding to the slow gear 201. Thus, engaging the first range connector 205 to couple the slow gear 201 to the auxiliary shaft 194 allows power to flow from the input shaft 102 to the first output shaft 104 and/or the second output shaft 106 in the sixth gear slow operation. For the forward and reverse sixth gear slow operations, the odd clutch 142 is disengaged. The seventh gear slow operation may be preselected by engaging the third synchronizer 173 to couple the seventh gear 7 to the odd shaft 152. The transmission 100 then allows for a performance of a powershift from the even clutch 138 to the odd clutch 142 (e.g., disengaging the even clutch 138 and engaging the odd clutch 142) to switch from the sixth gear slow operation to the seventh gear slow operation.

To operate the transmission 100 at the seventh gear slow operation, the master clutch 112 is likewise engaged. Similarly, for a forward or reverse seventh gear slow operation, the forward clutch 114 or the reverse clutch 118 is selectively engaged. The respective forward or reverse seventh gear slow operation occurs by engaging the odd clutch 142 to couple the odd shaft 152 with the first drive shaft 130; engaging the third synchronizer 173 to couple the seventh gear 7 to the odd shaft 152; in this embodiment, the seventh gear 7 is intermeshed with a fixed toothed wheel coupled to the second intermediate support shaft 182, which is intermeshed with the corresponding toothed wheel of the slow gear 201. Engaging the first range connector 205 couples the slow gear 201 to the auxiliary shaft 194. Power then flows from the input shaft 102 to the first output shaft 104 and/or the second output shaft 106 in the seventh gear slow operation. For the forward and reverse seventh gear slow operations, the even clutch 138 is disengaged. The eighth gear slow operation may be preselected by engaging the fourth synchronizer 174 to couple the eighth gear 8 to the even shaft 156. The transmission 100 then allows for a performance of a powershift from the odd clutch 142 to the even clutch 138 (e.g., disengaging the odd clutch 142 and engaging the even clutch 138) to switch from the seventh gear slow operation to the eighth gear slow operation.

To operate the transmission 100 at the eighth gear slow operation, the master clutch 112 is likewise engaged. Similarly, for a forward or reverse eighth gear slow operation, the forward clutch 114 or the reverse clutch 118 is selectively engaged. The respective forward or reverse eighth gear slow operation occurs by engaging the even clutch 138 to couple the even shaft 156 with the second drive shaft 146; engaging the fourth synchronizer 174 to couple the eighth gear 8 to the even shaft 156. In some embodiments, the eighth gear 8 is intermeshed with a toothed wheel of the second intermediate support shaft 182, which is likewise intermeshed with a toothed wheel of the gear corresponding to the slow gear 201. Thus, engaging the first range connector 205 to couple the slow gear 201 to the auxiliary shaft 194 allows power to flow from the input shaft 102 to the first output shaft 104 and/or the second output shaft 106 in the eighth gear slow operation. For the forward and reverse eighth gear slow operations, the odd clutch 142 is disengaged.

A second set of eight ratios may occur by engaging the first gear 1 through the eighth gear 8 across the range associated with the medium gear 202. While operating the vehicle 10 in the eight gear slow operation, the first gear medium operation may be preselected by engaging the first synchronizer 171 to couple the first gear 1 to the odd shaft 152, engaging the first intermediate connector 184 to couple the first intermediate support shaft 180 to the intermediate shaft 176, disengaging the second intermediate connector 185 and engaging the second range connector 206 to couple the medium gear 202 to the auxiliary shaft 194. To operate the transmission 100 at a first gear medium operation, the master clutch 112 is engaged, transferring rotational energy to the first main stage shaft 122 and the second main stage shaft 126. For a forward or reverse first gear medium operation, the forward clutch 114 and the reverse clutch 118 are selectively engaged, transferring rotational energy associated with the associated operation to the first drive shaft 130, the second drive shaft 146, and the idler 148. The respective forward or reverse first gear medium operation occurs by engaging the odd clutch 142 to couple the odd shaft 152 with the first drive shaft 130; engaging the first synchronizer 171 to couple the first gear 1 to the odd shaft 152; engaging the first intermediate connector 184 to couple the first intermediate support shaft 180 to the intermediate shaft 176, which includes a toothed wheel intermeshed with a corresponding gear of the medium gear 202; and engaging the second range connector 206 to couple the medium gear 202 to the auxiliary shaft 194. Power then flows from the input shaft 102 to the first output shaft 104 and/or the second output shaft 106 in the first gear medium operation. For the forward and reverse first gear medium operations, the even clutch 138 is disengaged. The second gear medium operation may be preselected by engaging the second synchronizer 172 to couple the second gear 2 to the even shaft 156. The transmission 100 then allows for a performance of a powershift from the odd clutch 142 to the even clutch 138 (e.g., disengaging the odd clutch 142 and engaging the even clutch 138) to switch from the first gear medium operation to the second gear medium operation.

To operate the transmission 100 at the second gear medium operation, the master clutch 112 is likewise engaged. Similarly, for a forward or reverse second gear medium operation, the forward clutch 114 or the reverse clutch 118 is selectively engaged, transferring rotational energy associated with the respective operation to the first drive shaft 130, the second drive shaft 146, and the idler 148. The respective forward or reverse second gear medium operation occurs by engaging the even clutch 138 to couple the even shaft 156 with the second drive shaft 146; engaging the second synchronizer 172 to couple the second gear 2 to the even shaft 156; engaging the first intermediate connector 184 to couple the first intermediate support shaft 180 to the intermediate shaft 176, which includes a toothed wheel intermeshed with a corresponding gear of the medium gear 202; and engaging the second range connector 206 to couple the medium gear 202 to the auxiliary shaft 194. Power then flows from the input shaft 102 to the first output shaft 104 and/or the second output shaft 106 in the second gear medium operation. For the forward and reverse second gear medium operations, the odd clutch 142 is disengaged. The third gear medium operation may be preselected by engaging the first synchronizer 171 to couple the third gear 3 to the odd shaft 152. The transmission 100 then allows for a performance of a powershift from the even clutch 138 to the odd clutch 142 (e.g., disengaging the even clutch 138 and engaging the odd clutch 142) to switch from the second gear medium operation to the third gear medium operation.

To operate the transmission 100 at a third gear medium operation, the master clutch 112 is likewise engaged. Similarly, for a forward or reverse third gear medium operation, the forward clutch 114 or the reverse clutch 118 is selectively engaged. The respective forward or reverse third gear medium operation occurs by engaging the odd clutch 142 to couple the odd shaft 152 with the first drive shaft 130; engaging the first synchronizer 171 to couple the third gear 3 to the odd shaft 152; in this embodiment, the third gear 3 is intermeshed with a fixed toothed wheel coupled to the intermediate shaft 176, thus the first intermediate connector 184 is disengaged. Also, the intermediate shaft 176 is intermeshed with the corresponding gear to the medium gear 202, so the second intermediate connector 185 is disengaged; and engaging the second range connector 206 couples the medium gear 202 to the auxiliary shaft 194. Power then flows from the input shaft 102 to the first output shaft 104 and/or the second output shaft 106 in the third gear medium operation. For the forward and reverse third gear medium operations, the even clutch 138 is disengaged. The fourth gear medium operation may be preselected by engaging the second synchronizer 172 to couple the fourth gear 4 to the even shaft 156. The transmission 100 then allows for a performance of a powershift from the odd clutch 142 to the even clutch 138 (e.g., disengaging the odd clutch 142 and engaging the even clutch 138) to switch from the third gear medium operation to the fourth gear medium operation.

To operate the transmission 100 at the fourth gear medium operation, the master clutch 112 is likewise engaged. Similarly, for a forward or reverse fourth gear medium operation, the forward clutch 114 or the reverse clutch 118 is selectively engaged, transferring rotational energy associated with the respective operation to the first drive shaft 130, the second drive shaft 146, and the idler 148. The respective forward or reverse fourth gear medium operation occurs by engaging the even clutch 138 to couple the even shaft 156 with the second drive shaft 146; engaging the second synchronizer 172 to couple the fourth gear 4 to the even shaft 156; disengaging the first intermediate connector 184 because the fourth gear 4 is intermeshed with a toothed wheel of the intermediate shaft 176. Also, the intermediate shaft 176 is intermeshed with the corresponding gear to the medium gear 202, so the second intermediate connector 185 may be disengaged; and engaging the second range connector 206 couples the medium gear 202 to the auxiliary shaft 194. Power then flows from the input shaft 102 to the first output shaft 104 and/or the second output shaft 106 in the fourth gear medium operation. For the forward and reverse fourth gear medium operations, the odd clutch 142 is disengaged. The fifth gear medium operation may be preselected by engaging the third synchronizer 173 to couple the fifth gear 5 to the odd shaft 152, and by engaging the second intermediate connector 185 to couple the second intermediate support shaft 182 to the intermediate shaft 176. The transmission 100 then allows for a performance of a powershift from the even clutch 138 to the odd clutch 142 (e.g., disengaging the even clutch 138 and engaging the odd clutch 142) to switch from the fourth gear medium operation to the fifth gear medium operation.

To operate the transmission 100 at the fifth gear medium operation, the master clutch 112 is likewise engaged. Similarly, for a forward or reverse fifth gear medium operation, the forward clutch 114 or the reverse clutch 118 is selectively engaged. The respective forward or reverse fifth gear medium operation occurs by engaging the odd clutch 142 to couple the odd shaft 152 with the first drive shaft 130; engaging the third synchronizer 173 to couple the fifth gear 5 to the odd shaft 152; in this embodiment, the fifth gear 5 is intermeshed with a fixed toothed wheel coupled to the second intermediate support shaft 182, so engaging the second intermediate connector 185 is required to couple the second intermediate support shaft 182 to the intermediate shaft 176. Engaging the second range connector 206 couples the medium gear 202 to the auxiliary shaft 194. Power then flows from the input shaft 102 to the first output shaft 104 and/or the second output shaft 106 in the fifth gear medium operation. For the forward and reverse fifth gear medium operations, the even clutch 138 is disengaged. The sixth gear medium operation may be preselected by engaging the fourth synchronizer 174 to couple the sixth gear 6 to the even shaft 156. The transmission 100 then allows for a performance of a powershift from the odd clutch 142 to the even clutch 138 (e.g., disengaging the odd clutch 142 and engaging the even clutch 138) to switch from the fifth gear medium operation to the sixth gear medium operation.

To operate the transmission 100 at the sixth gear medium operation, the master clutch 112 is likewise engaged. Similarly, for a forward or reverse sixth gear medium operation, the forward clutch 114 or the reverse clutch 118 is selectively engaged. The respective forward or reverse sixth gear medium operation occurs by engaging the even clutch 138 to couple the even shaft 156 with the second drive shaft 146; engaging the fourth synchronizer 174 to couple the sixth gear 6 to the even shaft 156. The sixth gear 6 is intermeshed with a toothed wheel of the second intermediate support shaft 182, so engaging the second intermediate connector 185 couples the second intermediate support shaft 182 with the intermediate shaft 176, which is intermeshed with the corresponding gear to the medium gear 202. Thus, engaging the second range connector 206 to couple the medium gear 202 to the auxiliary shaft 194 allows power to flow from the input shaft 102 to the first output shaft 104 and/or the second output shaft 106 in the sixth gear medium operation. For the forward and reverse sixth gear medium operations, the odd clutch 142 is disengaged. The seventh gear medium operation may be preselected by engaging the third synchronizer 173 to couple the seventh gear 7 to the odd shaft 152. The transmission 100 then allows for a performance of a powershift from the even clutch 138 to the odd clutch 142 (e.g., disengaging the even clutch 138 and engaging the odd clutch 142) to switch from the sixth gear medium operation to the seventh gear medium operation.

To operate the transmission 100 at the seventh gear medium operation, the master clutch 112 is likewise engaged. Similarly, for a forward or reverse seventh gear medium operation, the forward clutch 114 or the reverse clutch 118 is selectively engaged. The respective forward or reverse seventh gear medium operation occurs by engaging the odd clutch 142 to couple the odd shaft 152 with the first drive shaft 130; engaging the third synchronizer 173 to couple the seventh gear 7 to the odd shaft 152; in this embodiment, the seventh gear 7 is intermeshed with a fixed toothed wheel coupled to the second intermediate support shaft 182, so engaging the second intermediate connector 185 couples the second intermediate support shaft 182 with the intermediate shaft 176, which is intermeshed with the corresponding gear to the medium gear 202. Engaging the second range connector 206 couples the medium gear 202 to the auxiliary shaft 194. Power then flows from the input shaft 102 to the first output shaft 104 and/or the second output shaft 106 in the seventh gear medium operation. For the forward and reverse seventh gear medium operations, the even clutch 138 is disengaged. The eighth gear medium operation may be preselected by engaging the fourth synchronizer 174 to couple the eighth gear 8 to the even shaft 156. The transmission 100 then allows for a performance of a powershift from the odd clutch 142 to the even clutch 138 (e.g., disengaging the odd clutch 142 and engaging the even clutch 138) to switch from the seventh gear medium operation to the eighth gear medium operation.

To operate the transmission 100 at the eighth gear medium operation, the master clutch 112 is likewise engaged. Similarly, for a forward or reverse eighth gear medium operation, the forward clutch 114 or the reverse clutch 118 is selectively engaged. The respective forward or reverse eighth gear medium operation occurs by engaging the even clutch 138 to couple the even shaft 156 with the second drive shaft 146; engaging the fourth synchronizer 174 to couple the eighth gear 8 to the even shaft 156. In some embodiments, the eighth gear 8 is intermeshed with a toothed wheel of the second intermediate support shaft 182, so engaging the second intermediate connector 185 couples the second intermediate support shaft 182 with the intermediate shaft 176, which is intermeshed with the corresponding gear to the medium gear 202. Thus, engaging the second range connector 206 couples the medium gear 202 to the auxiliary shaft 194 allows power to flow from the input shaft 102 to the first output shaft 104 and/or the second output shaft 106 in the eighth gear medium operation. For the forward and reverse eighth gear medium operations, the odd clutch 142 is disengaged.

A third set of eight ratios may occur by engaging the first gear 1 through the eighth gear 8 across the range associated with the fast gear 203. While operating the vehicle 10 in the eight gear medium operation, the first gear fast operation may be preselected by engaging the first synchronizer 171 to couple the first gear 1 to the odd shaft 152, and engaging the first range connector 205 to couple the fast gear 302 to the auxiliary shaft 194. To operate the transmission 100 at a first gear fast operation, the master clutch 112 is engaged. For a forward or reverse first gear fast operation, the forward clutch 114 and the reverse clutch 118 are selectively engaged, transferring rotational energy associated with the associated operation to the first drive shaft 130, the second drive shaft 146, and the idler 148. The respective forward or reverse first gear fast operation occurs by engaging the odd clutch 142 to couple the odd shaft 152 with the first drive shaft 130; engaging the first synchronizer 171 to couple the first gear 1 to the odd shaft 152; in the embodiment shown in FIG. 4, the first gear 1 includes a toothed wheel intermeshed with a corresponding gear of the fast gear 203; and engaging the first range connector 205 to couple the fast gear 203 to the auxiliary shaft 194 causes power to flow from the input shaft 102 to the first output shaft 104 and/or the second output shaft 106 in the first gear fast operation. For the forward and reverse first gear fast operations, the even clutch 138 is disengaged. The second gear fast operation may be preselected by engaging the second synchronizer 172 to couple the second gear 2 to the even shaft 156. The transmission 100 then allows for a performance of a powershift from the odd clutch 142 to the even clutch 138 (e.g., disengaging the odd clutch 142 and engaging the even clutch 138) to switch from the first gear fast operation to the second gear fast operation.

To operate the transmission 100 at the second gear fast operation, the master clutch 112 is likewise engaged. Similarly, for a forward or reverse second gear fast operation, the forward clutch 114 or the reverse clutch 118 is selectively engaged, transferring rotational energy associated with the respective operation to the first drive shaft 130, the second drive shaft 146, and the idler 148. The respective forward or reverse second gear fast operation occurs by engaging the even clutch 138 to couple the even shaft 156 with the second drive shaft 146; engaging the second synchronizer 172 to couple the second gear 2 to the even shaft 156; the second gear 2 is intermeshed with the first intermediate support shaft 180, which is intermeshed with the gear corresponding to the fast gear 203; and engaging the first range connector 205 to couple the fast gear 203 to the auxiliary shaft 194 causes power to flow from the input shaft 102 to the first output shaft 104 and/or the second output shaft 106 in the second gear fast operation. For the forward and reverse second gear fast operations, the odd clutch 142 is disengaged. The third gear fast operation may be preselected by engaging the first synchronizer 171 to couple the third gear 3 to the odd shaft 152, and by engaging the first intermediate connector 184 to couple the first intermediate support shaft 180 to the intermediate shaft 176. The transmission 100 then allows for a performance of a powershift from the even clutch 138 to the odd clutch 142 (e.g., disengaging the even clutch 138 and engaging the odd clutch 142) to switch from the second gear fast operation to the third gear fast operation.

To operate the transmission 100 at a third gear fast operation, the master clutch 112 is likewise engaged. Similarly, for a forward or reverse third gear fast operation, the forward clutch 114 or the reverse clutch 118 is selectively engaged. The respective forward or reverse third gear fast operation occurs by engaging the odd clutch 142 to couple the odd shaft 152 with the first drive shaft 130; engaging the first synchronizer 171 to couple the third gear 3 to the odd shaft 152; in this embodiment, the third gear 3 is intermeshed with a fixed toothed wheel coupled to the intermediate shaft 176, thus the first intermediate connector 184 is engaged to couple the intermediate shaft 176 with the first intermediate support shaft 180, which is intermeshed with the gear corresponding to the fast gear 203. Engaging the first range connector 205 couples the fast gear 203 to the auxiliary shaft 194. Power then flows from the input shaft 102 to the first output shaft 104 and/or the second output shaft 106 in the third gear fast operation. For the forward and reverse third gear fast operations, the even clutch 138 is disengaged. The fourth gear fast operation may be preselected by engaging the second synchronizer 172 to couple the fourth gear 4 to the even shaft 156. The transmission 100 then allows for a performance of a powershift from the odd clutch 142 to the even clutch 138 (e.g., disengaging the odd clutch 142 and engaging the even clutch 138) to switch from the third gear fast operation to the fourth gear fast operation.

To operate the transmission 100 at the fourth gear fast operation, the master clutch 112 is likewise engaged. Similarly, for a forward or reverse fourth gear medium operation, the forward clutch 114 or the reverse clutch 118 is selectively engaged, transferring rotational energy associated with the respective operation to the first drive shaft 130, the second drive shaft 146, and the idler 148. The respective forward or reverse fourth gear fast operation occurs by engaging the even clutch 138 to couple the even shaft 156 with the second drive shaft 146; engaging the second synchronizer 172 to couple the fourth gear 4 to the even shaft 156; engaging the first intermediate connector 184 to couple the intermediate shaft 176 with the first intermediate support shaft 180. The fourth gear 4 is intermeshed with a toothed wheel of the intermediate shaft 176. Also, the first intermediate support shaft 180 is intermeshed with the corresponding gear to the fast gear 203, so the second intermediate connector 185 may be disengaged; and engaging the first range connector 205 couples the fast gear 203 to the auxiliary shaft 194. Power then flows from the input shaft 102 to the first output shaft 104 and/or the second output shaft 106 in the fourth gear fast operation. For the forward and reverse fourth gear fast operations, the odd clutch 142 is disengaged. The fifth gear fast operation may be preselected by engaging the third synchronizer 173 to couple the fifth gear 5 to the odd shaft 152, and by engaging the second intermediate connector 185 to couple the second intermediate support shaft 182 to the intermediate shaft 176. The transmission 100 then allows for a performance of a powershift from the even clutch 138 to the odd clutch 142 (e.g., disengaging the even clutch 138 and engaging the odd clutch 142) to switch from the fourth gear fast operation to the fifth gear fast operation.

To operate the transmission 100 at the fifth gear fast operation, the master clutch 112 is likewise engaged. Similarly, for a forward or reverse fifth gear fast operation, the forward clutch 114 or the reverse clutch 118 is selectively engaged. The respective forward or reverse fifth gear fast operation occurs by engaging the odd clutch 142 to couple the odd shaft 152 with the first drive shaft 130; engaging the third synchronizer 173 to couple the fifth gear 5 to the odd shaft 152; in this embodiment, the fifth gear 5 is intermeshed with a fixed toothed wheel coupled to the second intermediate support shaft 182, so engaging the second intermediate connector 185 is required to couple the second intermediate support shaft 182 to the intermediate shaft 176. Also, engaging the first intermediate connector 184 is required to couple the first intermediate support shaft 180 to the intermediate shaft 176. Engaging the first range connector 205 couples the fast gear 203 to the auxiliary shaft 194. Power then flows from the input shaft 102 to the first output shaft 104 and/or the second output shaft 106 in the fifth gear fast operation. For the forward and reverse fifth gear fast operations, the even clutch 138 is disengaged. The sixth gear fast operation may be preselected by engaging the fourth synchronizer 174 to couple the sixth gear 6 to the even shaft 156. The transmission 100 then allows for a performance of a powershift from the odd clutch 142 to the even clutch 138 (e.g., disengaging the odd clutch 142 and engaging the even clutch 138) to switch from the fifth gear fast operation to the sixth gear fast operation.

To operate the transmission 100 at the sixth gear fast operation, the master clutch 112 is likewise engaged. Similarly, for a forward or reverse sixth gear fast operation, the forward clutch 114 or the reverse clutch 118 is selectively engaged. The respective forward or reverse sixth gear fast operation occurs by engaging the even clutch 138 to couple the even shaft 156 with the second drive shaft 146; engaging the fourth synchronizer 174 to couple the sixth gear 6 to the even shaft 156. The sixth gear 6 is intermeshed with a toothed wheel of the second intermediate support shaft 182, so engaging the second intermediate connector 185 couples the second intermediate support shaft 182 with the intermediate shaft 176. Also, engaging the first intermediate connector 184 is required to couple the intermediate shaft 176 with the first intermediate support shaft 180, which is intermeshed with the corresponding gear to the fast gear 203. Thus, engaging the first range connector 205 to couple the fast gear 203 to the auxiliary shaft 194 allows power to flow from the input shaft 102 to the first output shaft 104 and/or the second output shaft 106 in the sixth gear fast operation. For the forward and reverse sixth gear fast operations, the odd clutch 142 is disengaged. The seventh gear fast operation may be preselected by engaging the third synchronizer 173 to couple the seventh gear 7 to the odd shaft 152. The transmission 100 then allows for a performance of a powershift from the even clutch 138 to the odd clutch 142 (e.g., disengaging the even clutch 138 and engaging the odd clutch 142) to switch from the sixth gear fast operation to the seventh gear fast operation.

To operate the transmission 100 at the seventh gear fast operation, the master clutch 112 is likewise engaged. Similarly, for a forward or reverse seventh gear fast operation, the forward clutch 114 or the reverse clutch 118 is selectively engaged. The respective forward or reverse seventh gear fast operation occurs by engaging the odd clutch 142 to couple the odd shaft 152 with the first drive shaft 130; engaging the third synchronizer 173 to couple the seventh gear 7 to the odd shaft 152; in this embodiment, the seventh gear 7 is intermeshed with a fixed toothed wheel coupled to the second intermediate support shaft 182, so engaging the second intermediate connector 185 couples the second intermediate support shaft 182 with the intermediate shaft 176. Also, engaging the first intermediate connector 184 couples the intermediate shaft 176 to the first intermediate support shaft 180, which is intermeshed with the gear corresponding to the fast gear 203. Engaging the first range connector 205 couples the fast gear 203 to the auxiliary shaft 194. Power then flows from the input shaft 102 to the first output shaft 104 and/or the second output shaft 106 in the seventh gear fast operation. For the forward and reverse seventh gear fast operations, the even clutch 138 is disengaged. The eighth gear fast operation may be preselected by engaging the fourth synchronizer 174 to couple the eighth gear 8 to the even shaft 156. The transmission 100 then allows for a performance of a powershift from the odd clutch 142 to the even clutch 138 (e.g., disengaging the odd clutch 142 and engaging the even clutch 138) to switch from the seventh gear fast operation to the eighth gear fast operation.

To operate the transmission 100 at the eighth gear fast operation, the master clutch 112 is likewise engaged. Similarly, for a forward or reverse eighth gear fast operation, the forward clutch 114 or the reverse clutch 118 is selectively engaged. The respective forward or reverse eighth gear fast operation occurs by engaging the even clutch 138 to couple the even shaft 156 with the second drive shaft 146; engaging the fourth synchronizer 174 to couple the eighth gear 8 to the even shaft 156. In some embodiments, the eighth gear 8 is intermeshed with a toothed wheel of the second intermediate support shaft 182, so engaging the second intermediate connector 185 couples the second intermediate support shaft 182 with the intermediate shaft 176. Engaging the first intermediate connector 184 couples the intermediate shaft 176 with the first intermediate support shaft 180, which is intermeshed with the gear that corresponds to the fast gear 203. Thus, engaging the first range connector 205 couples the fast gear 203 to the auxiliary shaft 194 allows power to flow from the input shaft 102 to the first output shaft 104 and/or the second output shaft 106 in the eighth gear fast operation. For the forward and reverse eighth gear fast operations, the odd clutch 142 is disengaged.

Additional Power Flow Connections

In some embodiments, the main shaft 108 is further rotationally coupled to at least one PTO clutch 210. The at least one PTO clutch 210 may provide a gear ratio drop and be connected to a PTO input shaft (not shown) to deliver rotational power from the transmission 100 to implements connected to the vehicle 10 (e.g., headers, mowers, etc. coupled to the vehicle 10).

In other embodiments, the main shaft 108 further includes a pump idler 214 that rotationally couples the main shaft 108 to one or more gears configured to power/provide rotational energy to an internal pump drive 218 and an external pump drive 222. The internal pump drive 218 is configured to feed oil, provide lubrication for the internal gears of the transmission 100, regulate pressure control to the master clutch 112, forward clutch 114, reverse clutch 118, even clutch 138, odd clutch 142, plurality of gear connectors 170, plurality of intermediate connectors 183, etc. (e.g., regulate applications occurring within or related to the transmission 100). Similarly, the external pump drive 222 supplies power, regulates pressure, provides lubrication, or otherwise regulates and supplies power to other implements of the vehicle 10 not directly related to transmission control.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the driveline 50, the braking system 92, the control system 96, etc.) as shown in the various exemplary embodiments is illustrative only. Additionally, any element disclosed in one embodiment may be incorporated or utilized with any other embodiment disclosed herein.

What is claimed is:

1. A dual clutch power shift transmission for an agricultural vehicle, comprising:
    an input shaft configured to be connected to a prime mover of the agricultural vehicle;
    a main shaft rotationally coupled to the input shaft;
    an output shaft configured to be selectively coupled to the input shaft to translate power to a tractive assembly of the agricultural vehicle;
    an odd shaft and an even shaft, each configured to carry a plurality of gears, each of the plurality of gears defining a predetermined gear ratio between the input shaft and the output shaft;
    the odd shaft configured to be selectively coupled to the input shaft via an odd clutch and a master clutch, and the even shaft configured to be selectively coupled to the input shaft via an even clutch and the master clutch;
    a forward clutch and a reverse clutch interposed between the master clutch and the odd clutch, and interposed between the master clutch and the even clutch, the forward and reverse clutch configured to be alternatively coupled to the input shaft;
    an intermediate shaft assembly interposed between the odd shaft and the even shaft, the intermediate shaft assembly configured to rotationally couple each gear of the plurality of gears with a corresponding gear of the plurality of gears;
    an auxiliary shaft interposed between the odd shaft and the output shaft, the auxiliary shaft configured to carry a plurality of range gears, each of the plurality of range gears defining a predetermine gear ratio between the input shaft and the output shaft.

2. The dual clutch power shift transmission of claim 1, wherein:
    the plurality of gears defines a first group of gears coaxial with the even shaft and a second group of gears coaxial with the odd shaft; and
    each of the plurality of gears is rotationally coupled to another of the plurality of gears via a connection with a toothed wheel of the intermediate shaft assembly.

3. The dual clutch power shift transmission of claim 1, further comprising:
    a plurality of gear connectors, each of the plurality of gear connectors configured to selectively couple at least one of the plurality of gears to the odd shaft or the even shaft.

4. The dual clutch power shift transmission of claim 2, wherein:
    the plurality of gears includes eight gears;

the first group of gears coaxial with the even shaft includes a second gear, a fourth gear, a sixth gear, and an eighth gear of varying diameters; and the second group of gears coaxial with the odd shaft includes a first gear, a third gear, a fifth gear, and a seventh gear with varying diameters.

5. The dual clutch power shift transmission of claim 3, wherein the plurality of gear connectors includes:
   a first synchronizer configured to selectively couple a first gear or a third gear to the odd shaft;
   a second synchronizer configured to selectively couple a second gear or a fourth gear to the even shaft;
   a third synchronizer configured to selectively couple a fifth gear or a seventh gear to the odd shaft; and
   a fourth synchronizer configured to selectively couple a sixth gear or an eighth gear to the even shaft.

6. The dual clutch power shift transmission of claim 1, wherein:
   the intermediate shaft assembly includes:
      an intermediate shaft having two toothed wheels rotationally fixed to the intermediate shaft,
      a first intermediate support shaft coaxial with the intermediate shaft and having at least one toothed wheel rotationally fixed to the first intermediate support shaft,
      a second intermediate support shaft coaxial with the intermediate shaft and having at least one toothed wheel rotationally fixed to the second intermediate support shaft.

7. The dual clutch power shift transmission of claim 6, further comprising:
   a plurality of intermediate connectors, each intermediate connector configured to selectively couple the intermediate shaft to the first intermediate support shaft or the second intermediate support shaft.

8. The dual clutch power shift transmission of claim 1, wherein:
   the plurality of range gears includes a slow gear, a medium gear, and a fast gear; and
   engaging the plurality of gears with the plurality of range gears results in a combination of twenty-four possible forward gear ratios and twenty-four possible reverse gear ratios.

9. The dual clutch power shift transmission of claim 8, further comprising:
   one or more range connectors, each range connector configured to selectively couple one or more range gears with the auxiliary shaft.

10. The dual clutch power shift transmission of claim 1, wherein:
    the output shaft includes a first output shaft coupled to a rear tractive assembly and a second output shaft coupled to a front tractive assembly; and
    the first output shaft is rotationally coupled to the second output shaft.

11. The dual clutch power shift transmission of claim 1, further comprising:
    a dropbox idler interposed between the input shaft and the main shaft.

12. A dual clutch power shift transmission architecture for a vehicle, the dual clutch power shift transmission architecture comprising:
    an input shaft configured to be connected to an output of a prime mover;
    a main shaft rotationally coupled to the input shaft;
    a first drive shaft and a second drive shaft, the second drive shaft coaxial to the main shaft and rotationally coupled to the first drive shaft via an idler gear;
    an even shaft coaxial with the main shaft and configured to be selectively coupled to the second drive shaft;
    an odd shaft configured to be selectively coupled to the first drive shaft;
    an intermediate shaft assembly interposed between the even shaft and the odd shaft;
    an output shaft configured to be selectively coupled to the input shaft to translate power to a tractive assembly of the vehicle;
    an auxiliary shaft interposed between the odd shaft and the output shaft;
    a main stage including:
       a master clutch configured to selectively couple the main shaft to a forward clutch or a reverse clutch,
       the forward clutch configured to selectively couple the main stage to the second drive shaft,
       the reverse clutch configured to selectively couple the main stage to the first drive shaft;
    a second stage including:
       an even clutch configured to selectively couple the second drive shaft to the even shaft,
       an odd clutch configured to selectively couple the first drive shaft to the odd shaft,
       an idler rotationally coupling the first drive shaft to the second drive shaft;
    a gear-speed stage including:
       a plurality of gears coaxial to the even shaft or the odd shaft, each of the plurality of gears rotationally coupled to the intermediate shaft assembly,
       a plurality of gear connectors configured to selectively couple one or more of the plurality of gears to the even shaft or the odd shaft;
    a ranges stage including:
       a plurality of range gears coaxial to the auxiliary shaft, each of the plurality of range gears configured to rotationally couple with one of the plurality of gears or with intermediate shaft assembly.

13. The dual clutch power shift transmission architecture of claim 12, wherein:
    the intermediate shaft assembly includes:
       an intermediate shaft having two toothed wheels rotationally fixed to the intermediate shaft,
       a first intermediate support shaft coaxial with the intermediate shaft and having at least one toothed wheel rotationally fixed to the first intermediate support shaft,
       a second intermediate support shaft coaxial with the intermediate shaft and having at least one toothed wheel rotationally fixed to the second intermediate support shaft.

14. The dual clutch power shift transmission architecture of claim 13, further comprising:
    a plurality of intermediate connectors, each intermediate connector configured to selectively couple the intermediate shaft to the first intermediate support shaft or the second intermediate support shaft.

15. The dual clutch power shift transmission architecture of claim 12, wherein:
    the plurality of range gears includes a slow gear, a medium gear, and a fast gear; and
    engaging the plurality of gears with the plurality of range gears results in a combination of twenty-four possible forward gear ratios and twenty-four possible reverse gear ratios.

16. The dual clutch power shift transmission architecture of claim 15, further comprising:
one or more range connectors, each range connector configured to selectively couple one or more range gears with the auxiliary shaft.

17. A dual clutch power shift transmission comprising:
an input shaft configured to be coupled to an output of a prime mover;
an output shaft configured to be coupled to a tractive assembly;
an auxiliary shaft rotationally coupled to the output shaft and interposed between the input shaft and the output shaft;
a main shaft rotationally coupled to the input shaft and interposed between the input shaft and the output shaft;
an even shaft coaxial with the main shaft and configured to be selectively coupled to a first drive shaft and a second drive shaft via an even clutch;
an odd clutch configured to selectively couple the first drive shaft and the second drive shaft to an odd shaft;
an intermediate shaft assembly interposed between the even shaft and the odd shaft;
a main stage assembly including a master clutch, a forward clutch, and a reverse clutch, the main stage assembly configured to selectively couple the main shaft to the first drive shaft and the second drive shaft.

18. The dual clutch power shift transmission of claim 17, further comprising:
a plurality of gears including a first group of gears coaxial to the odd shaft and a second group of gears coaxial to the even shaft; and
a plurality of gear connectors, each of the plurality of gear connectors configured to selectively couple at least one of the plurality of gears to the odd shaft or the even shaft.

19. The dual clutch power shift transmission of claim 17, wherein:
the intermediate shaft assembly includes:
an intermediate shaft having two toothed wheels rotationally fixed to the intermediate shaft,
a first intermediate support shaft coaxial with the intermediate shaft and having at least one toothed wheel rotationally fixed to the first intermediate support shaft,
a second intermediate support shaft coaxial with the intermediate shaft and having at least one toothed wheel rotationally fixed to the second intermediate support shaft.

20. The dual clutch power shift transmission of claim 19, further comprising:
a plurality of intermediate connectors, each intermediate connector configured to selectively couple the intermediate shaft to the first intermediate support shaft or the second intermediate support shaft.

* * * * *